United States Patent
Wylie

(10) Patent No.: US 10,511,250 B2
(45) Date of Patent: Dec. 17, 2019

(54) SOLAR-COLLECTOR ROOFING ASSEMBLY

(71) Applicant: SOLAR FRAME SOLUTIONS LIMITED, Newbury (GB)

(72) Inventor: Gordon Wylie, Surrey (GB)

(73) Assignee: Solar Frame Solutions Ltd, Newbury (GB)

(*) Notice: Subject to any disclaimer, the term of this patent is extended or adjusted under 35 U.S.C. 154(b) by 0 days.

(21) Appl. No.: 15/310,800

(22) PCT Filed: May 6, 2015

(86) PCT No.: PCT/GB2015/051331
§ 371 (c)(1),
(2) Date: Nov. 14, 2016

(87) PCT Pub. No.: WO2015/173542
PCT Pub. Date: Nov. 19, 2015

(65) Prior Publication Data
US 2017/0093328 A1   Mar. 30, 2017

(30) Foreign Application Priority Data

May 16, 2014  (GB) ..................................... 1408725
Apr. 1, 2015  (GB) ..................................... 1505655

(51) Int. Cl.
*E04D 13/18*  (2018.01)
*H02S 20/23*  (2014.01)
(Continued)

(52) U.S. Cl.
CPC ............. *H02S 20/23* (2014.12); *E04D 13/064* (2013.01); *E04D 13/103* (2013.01); *E04H 6/08* (2013.01);
(Continued)

(58) Field of Classification Search
CPC .......... H02S 20/23; H02S 40/12; H02S 30/10; E04D 13/064; E04D 13/103; E04H 6/08; F24J 2/045; F24J 2/5232
(Continued)

(56) References Cited

U.S. PATENT DOCUMENTS

2005/0252507 A1* 11/2005 Hollick ................. F24F 5/0046
                                                            126/621
2009/0050194 A1  2/2009 Noble et al.
(Continued)

FOREIGN PATENT DOCUMENTS

CH          653730 A5    1/1986
DE      202008009241 U1   12/2009
(Continued)

OTHER PUBLICATIONS

UK Intellectual Property Office Search Report dated May 20, 2015.
(Continued)

*Primary Examiner* — Basil S Katcheves
(74) *Attorney, Agent, or Firm* — Patshegen IP LLC; Moshe Pinchas

(57) ABSTRACT

A solar-collector roofing assembly (10) comprises a plurality of elongate spaced-apart primary support members (12) aligned in a horizontal plane and extending in a first direction A; a plurality of elongate spaced-apart secondary support members (14) having first and second end portions (38, 40) connected to corresponding said primary support members (12), first and second end portions (38, 40) on a respective primary support member (12) being vertically offset relative to each other; and at least one solar-energy collector panel (16) directly or indirectly supported by the secondary support members (14) so as to have a predetermined fall towards an associated primary support member (12).

12 Claims, 7 Drawing Sheets

(51) Int. Cl.
*H02S 30/10* (2014.01)
*H02S 40/12* (2014.01)
*F24S 20/67* (2018.01)
*F24S 25/12* (2018.01)
*E04D 13/064* (2006.01)
*E04D 13/10* (2006.01)
*E04H 6/08* (2006.01)

(52) U.S. Cl.
CPC .............. *F24S 20/67* (2018.05); *F24S 25/12* (2018.05); *H02S 30/10* (2014.12); *H02S 40/12* (2014.12); *Y02B 10/12* (2013.01); *Y02B 10/20* (2013.01); *Y02E 10/44* (2013.01); *Y02E 10/47* (2013.01)

(58) Field of Classification Search
USPC ............................................ 52/173.3, 745.21
See application file for complete search history.

(56) References Cited

U.S. PATENT DOCUMENTS

| | | | |
|---|---|---|---|
| 2010/0089433 A1* | 4/2010 | Conger | F24J 2/5241 136/244 |
| 2010/0237028 A1 | 9/2010 | Cusson | |
| 2010/0237029 A1 | 9/2010 | Cusson | |
| 2011/0220093 A1* | 9/2011 | Fernandez-Fernandez | F24J 2/045 126/622 |
| 2011/0290305 A1 | 12/2011 | Hoffmann | |
| 2012/0016815 A1 | 1/2012 | DeBartolo, III et al. | |
| 2012/0017526 A1* | 1/2012 | Eide | F24J 2/5207 52/173.3 |
| 2012/0167960 A1 | 7/2012 | Scorsone et al. | |
| 2014/0041321 A1* | 2/2014 | Poivet | F24J 2/5245 52/173.3 |
| 2016/0365825 A1* | 12/2016 | Poivet | H02S 20/23 |

FOREIGN PATENT DOCUMENTS

| | | |
|---|---|---|
| DE | 202010012826 U1 | 1/2011 |
| EP | 0371000 A1 | 5/1990 |
| EP | 2461120 A2 | 6/2012 |
| FR | 2965041 A1 | 3/2012 |
| WO | 2010063018 A2 | 6/2010 |
| WO | 2011136359 A1 | 11/2011 |
| WO | 2013143178 A1 | 10/2013 |

OTHER PUBLICATIONS

UK Intellectual Property Office Further Search Report dated Jul. 23, 2015.
International Search Report and Written Opinion of the ISA (EPO) dated Oct. 23, 2015.
International Preliminary Report on Patentability of the PCT dated Nov. 22, 2016 (International Bureau of WIPO).
UK Intellectual Property Office Search Report, dated Oct. 30, 2014.
UK Examination Report, dated Mar. 27, 2018.
UK Examination Report, dated May 29, 2018.
European Patent Office Examination and Search Report dated Oct. 9, 2018.
Examination Report UK; Sep. 9, 2019.

* cited by examiner

SOLAR-COLLECTOR ROOFING ASSEMBLY

The present invention relates to a solar-collector roofing assembly for an outdoor structure, and in particular but not necessarily exclusively for the case where the outdoor structure is a car park. The invention further relates to a method of reducing the wind-load experienced by the structure by using said solar-collector roofing assembly, and methods of reducing material used during construction of such a structure.

As modern society begins to reduce its energy dependence on fossil fuels, renewable energy sources will become more and more prevalent. In particular, solar power is one of the more promising sources of renewable energy. However, the power generated by solar collectors is proportional to the solar radiation incident upon them, and as such, their surface area.

With real estate at a premium, it can be difficult to find unshaded areas in which solar collectors can be installed. One such solution has been to install the solar collectors onto the roofs of buildings. To date, there have been several bathers to roof-mounting solar collectors on existing properties, however.

Often, roofs are positioned such that they are in the shadow of taller items; either other buildings, perhaps including chimneys, or trees. This results in a reduction in the incident solar radiation falling upon the collectors. Existing roofs may also not be correctly oriented so as to maximise solar radiation capture, or may not be sufficiently sturdy or well-maintained so as to be able to support solar collectors. Some residential and/or commercial building owners are not keen on the installation of solar collectors on their roofs due to a perceived risk that it may restrict future roof air space development.

Rather than installing the solar collectors on existing buildings, recent emphasis has been placed on creating free-standing roofing assemblies which are specifically designed to have solar collectors installed thereon.

To maximise the incident radiation falling upon the solar collectors, the collectors can be tilted so as to face the sun at its maximum astronomical altitude. In the northern hemisphere, this means that solar collectors are ideally inclined at an angle of around 35 to 40 degrees, facing south.

To achieve this inclination, roofing assemblies are constructed having a natural slope, with the solar collectors being affixed to the upper surface of interconnecting support members. If the structure including the roofing assembly lacks walls, as is the case for many car parks, then the wind-load on the roofing assembly having panels at such an inclination can be considerable, as the wind is caught by the slope of the assembly, creating large lateral forces. Additionally, solar collectors having panels with a large slope cast a longer shadow behind them which would greatly reduce the efficiency of any collectors within this shaded area.

The large wind-load on the roofing assembly means that the solar collector panels are more easily damaged in high winds, which can lead to greatly increased maintenance costs for the structure when compared with walled buildings.

The alternative is to construct a roofing assembly which has a considerably more rigid framework to support the solar-energy collector panels. Such a framework will result in a greater weight and cost of construction, with neither feature being desirable.

It is the object of the present invention to substantially obviate the above problems by providing a free-standing roofing assembly to support a plurality of solar-energy collector panels.

According to a first aspect of the invention, there is provided a solar-collector roofing assembly comprising: a plurality of elongate spaced-apart primary support members aligned in a plane and extending in a first direction; a plurality of elongate spaced-apart secondary support members having first and second end portions connected to corresponding said primary support members and aligned in a plane extending in a second direction perpendicular to the first direction; and at least one solar-energy collector panel directly or indirectly supported by the secondary support members, so as to have a predetermined fall; and the secondary support members including an integrally formed cable guide for holding one or more cables associated with the or each solar-energy collector panel.

Preferably, the or each solar-energy collector panel may be inclined at between 2 and 3 degrees. This inclination may allow a good level of solar radiation to be incident on the roofing system, whilst still limiting the overall wind loading on the structure.

In an optional anangement, the fall of the or each solar-energy collector panel may be sloped from a north to south direction, such that the or each solar-energy collector panel faces in a southward direction. In a different optional arrangement, the fall of the or each solar-energy collector panel may be sloped from a south to north direction, such that the or each solar-energy collector panel faces in a northward direction.

In order to maximise the incident solar radiation in the northern hemisphere, the solar-energy collector panels should be orientated to face the Sun, which may be seen in a generally southward direction. The opposite case exists in the southern hemisphere.

In a preferable anangement, the primary support members may be equally spaced apart. This may ensure that each of the primary support members may be subject to equal load, which minimises wasteful material use.

Beneficially, the solar-collector roofing assembly may further comprise a drainage system for the removal of excess water collected on the upper surface of the roofing assembly. The provision of drainage means may prevent water run-off into the interior of the structure.

Preferably, the solar-collector roofing assembly may further comprise heating means or a heating apparatus for inhibiting the formation of snow or ice on the or each solar-energy collector panel. This is advantageous as any build-up will add weight to the structure, which is undesirable.

According to a second aspect of the invention there is provided a solar-collector roofing assembly comprising: a plurality of elongate spaced-apart primary support members having ends aligned in a horizontal plane and extending in a first direction; a plurality of elongate spaced-apart secondary support members having end portions connected to corresponding said primary support members, the end portions on a respective primary support member being vertically offset relative to each other; and at least one solar-energy collector panel directly or indirectly supported by the secondary support members so as to have a predetermined fall towards an associated primary support member.

Such a solar-collector roofing assembly lies fully within a horizontal plane having a depth equal to the depth of the primary support members. As a result, wind passes over the aerodynamic roofing assembly without creating large lateral forces on the solar-energy collector panels. These forces are a substantial problem for roofing assemblies where the primary support members are not horizontal, for instance, long span roofing assemblies with high vertical 'steps' between sub-arrays, or cantilevered roofing assembly arrangements, both of which experience a strong net uplift and higher lateral force under a given wind-load. The planarity advantageously reduces the wind-load on the roofing assembly, resulting in reduced maintenance costs from wind damage, as well as allowing the roofing assembly to be constructed for the minimum cost per unit of generating capacity.

This cost is dependent upon a variety of factors such as: the number and length of structural members and connectors; the weight of steel used per meter run of structural member; the cost of fabrication of structural members and connections; the load on the foundations, which depends on the total weight of the frame above; and the number of columns, each requiring a foundation.

Existing roofing assemblies must utilise upright struts in order to provide the predetermined fall to the primary support members, and these struts are not required in the present invention. Therefore, the present roofing assembly is formed using fewer construction materials, and as a result can be created so as to be lighter than other assemblies, the wind-load being reduced.

Preferably, a plurality of further elongate spaced-apart primary support members may be provided aligned in the horizontal plane and extending in a second direction perpendicular to the first direction. Further primary support members advantageously increase the rigidity of the roofing assembly, at the cost of additional weight and construction materials. When building a roofing assembly, these factors must be taken into account to provide a sufficiently sturdy structure.

Preferably, the secondary support members may each have an upper flange, the or each solar-energy collector panel being connectable to the secondary support members via a fixing to the upper flange. The provision of an upper flange on the secondary support members advantageously allows for easy connection of the solar-energy collector panels to the roofing assembly, thereby simplifying maintenance in the event of damage to a solar-energy collector panel.

Furthermore, each secondary support member may be capable of being connected to a plurality of solar-energy collector panels. Increased modularisation additionally simplifies maintenance of the solar-energy collector panels. If only a portion of a solar-energy collector panel is damaged, it is preferable to replace a smaller panel than a larger one, since solar panels represent a large proportion of the cost of the solar collector roofing assembly. In the present invention, the solar collectors are relatively small, and there are many secondary support members, adding to the overall strength of the solar-energy collector panels.

Preferably, the fall of the or each solar-energy collector panel may be between 2 and 3 degrees. Also preferably, the first direction may be aligned in or substantially in an east-to-west direction, and still preferably the fall of the or each solar-energy collector panel may slope from a north to south direction, such that the or each solar-energy collector panel faces in a southward direction. This is preferable for use in the northern hemisphere.

Optionally, the fall of the or each solar-energy collector panel may instead slope from a south to north direction, such that the or each solar-energy collector panel faces in a northward direction. This allows the system to be optimised for use in the southern hemisphere.

The solar-collector roofing assembly is constructed to advantageously maximise the available area of the solar collectors for incident solar radiation by minimising the shadows cast by the raised portions of solar collectors on the lowered portions of other collectors, whilst minimising wind-load. An optimal orientation of the solar-energy collector panels in the present arrangement is therefore around two to three degrees, oriented southwardly, enabling each sub-army of solar collectors to be unshaded by an adjacent collector sub-array, with only narrow width gaps required between sub-arrays since the shadows are short.

If the fall of each solar-energy collector panel is shallow, this beneficially allows the sub-arrays between primary support members to be closer together. This reduces the amount of 'dead space', the area of the roofing assembly which is not able to utilise incident solar radiation, which consequentially increases the capacity of the roofing assembly to generate electricity.

Preferably, the primary support members are equally spaced apart. Alternatively, the primary support members may be unequally spaced apart. There are numerous ways in which the roofing assembly can be assembled. From a construction and manufacturing point of view, it may be beneficial to have equally spaced-apart primary support members, since this will require secondary support members of a uniform length. However, unequally spaced-apart primary support members may be advantageous if a particular anangement below the roofing assembly is required, for instance, where there is a car park in which the parking bays and access roads are of different sizes.

Preferably, the roofing assembly further comprises a drainage system for the removal of excess water collected on the upper surface of the roofing assembly. Additionally or alternatively, the roofing assembly may further comprise a heating apparatus for inhibiting the formation of snow or ice on the or each solar-energy collector panel.

It is beneficial to provide means of removing the physical effects of inclement weather from the roofing assembly, such as rainwater, snow or ice, since these conditions can both adversely affect the performance of the solar-energy collector panels and damage the panels themselves.

According to a third aspect of the invention, there is provided a vehicle parking system comprising: a surface for defining an access road in a first direction and a plurality of parking bays extending from the access road in a second direction transversely to the first direction; a solar-collector roofing assembly as claimed in any one of the preceding claims; and a plurality of vertical support members to support the solar-collector roofing assembly above said surface.

The solar-collector roofing assembly has been designed specifically for vehicle parking systems, primarily car parks, since these are large outdoor structures which are capable of supporting sufficient solar-energy collector panels to be economically viable. Advantageously, the vehicle parking system covers both the access roads and parking bays of the car park, which is often not achievable with cantilevered roofing assemblies, which usually only protect the parking bays.

The primary benefit of the roofing assembly when used in conjunction with a car park is that the ability to generate photovoltaic electricity adds value to a given area of land. The only possible source of revenue generation for a standard car park is created by charging for the parking spaces. By using the incident solar radiation on a roofing assembly over the car park, electricity can be generated, which the owner can use as they see fit. The electricity could be sold to the national grid and/or the owners of nearby buildings.

Preferably, the primary support members may be equally spaced-apart, and aligned perpendicularly to the access road. Since the access road of the vehicle parking system will typically be wider than the length of the parking bays, it may be advantageous to provide the primary support members in a perpendicular alignment to the access road, to permit the primary support members to be equally spaced-apart. As previously mentioned, this results in secondary support members of a standardised length, thereby simplifying the manufacturing process.

Preferably, the separation between the primary support members above the access road may be greater than the separation between the primary support members above the parking bays. Alternatively, the primary support members can be positioned in alignment with the access road, which may be advantageous for more bespoke car parks, allowing for a wider variety of vehicle parking systems to be constructed.

Preferably, the vertical support members may include an impact-resistant outer layer. Since an object of the invention is to reduce the number of structural components of the roofing assembly, this may diminish the overall strength of the assembly. Therefore, it is advantageous to provide impact-resistant outer layers for the vertical support members, in order to prevent damage to the structure as a whole, when the users of the vehicle parking system inevitably collide or impact with the vertical support members. This will also simultaneously reduce the damage to the vehicles.

Preferably, the vertical support members may have a height so as to allow sufficient clearance for a car to pass underneath. The primary customers of open-air car parks are car drivers, and therefore it is advantageous to position the roofing assembly at a height to permit the entry of cars, but not larger vehicles which would not be able to fit into a parking bay. However, it may also be necessary to accommodate medium-sized vehicles, such as vans.

According to a fourth aspect of the invention, there is provided a method of reducing the effects of wind-loading on a structure having a solar-collector roofing assembly comprising the steps of installing a solar-collector roofing assembly according to the second aspect of the invention, such that the plane in which the primary support members are installed is parallel or substantially parallel with the ground, thereby minimising the wind-force experienced by said solar-collector roofing assembly.

Preferably, the secondary support members may have a shallow predetermined fall in order to make the roofing assembly more aerodynamic.

Reducing the wind-load on the structure advantageously reduces the effect of lateral and uplift forces upon the roofing assembly, which will require a less strong and, consequently, lighter weight and lower cost assembly to support the collector panels. Primarily, wind-load can be reduced by aligning the roofing assembly as closely with the direction of the wind force, which is typically in the horizontal plane. Therefore, minimising the projection of the roofing assembly out of the horizontal plane will minimise the wind-load.

According to a fifth aspect of the invention, there is provided a method of reducing the material used and weight of a structure having a solar-collector roofing assembly comprising the steps of installing a solar-collector roofing assembly according to the second aspect of the invention, such that the plane in which the primary support members are installed is parallel or substantially parallel with the ground, thereby removing the requirement for spaced-apart vertical support members in the roofing assembly to provide a predetermined fall.

The removal of the vertical struts or support members utilised by existing roofing assemblies by using a solar-collector roofing assembly in accordance with the second aspect of the invention not only reduces the wind-load and associated net uplift on the roofing assembly, but also the overall weight of the structure.

By reducing the wind-load on a structure, it is less likely that there will be wind damage. This not only reduces the maintenance cost of the structure, but also means that it can be constructed with fewer supporting elements, thereby reducing the cost of manufacture.

According to a sixth aspect of the invention, there is provided a solar-collector roofing assembly comprising: a plurality of elongate spaced-apart primary support members aligned in a horizontal plane and extending in a first direction; a plurality of elongate spaced-apart secondary support members having first and second ends connected to corresponding said primary support members, first and second ends on a respective primary support member being vertically offset relative to each other; and at least one solar-energy collector panel directly or indirectly supported by the secondary support members so as to have a predetermined fall towards an associated primary support member.

The invention will now be more particularly described, by way of example only, with reference to the accompanying drawings, in which.

Figure 11B:
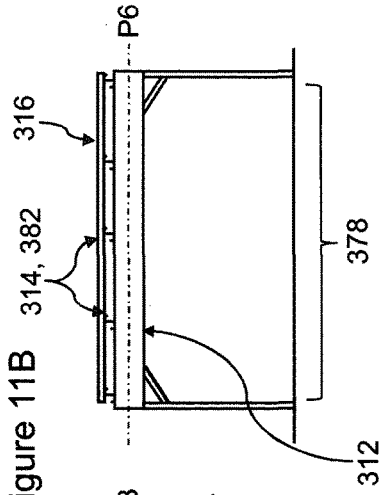
FIG. 11A shows a side-on view of a third embodiment of a solar collector roofing assembly in accordance with the first aspect of the invention.
Figure 11A:
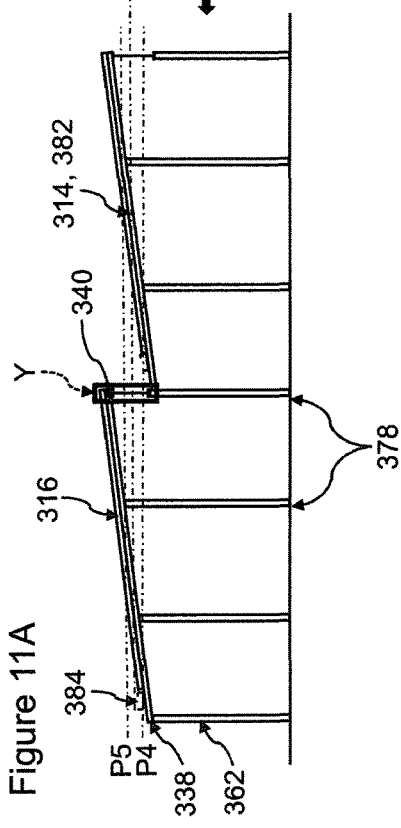
Figure 11C:
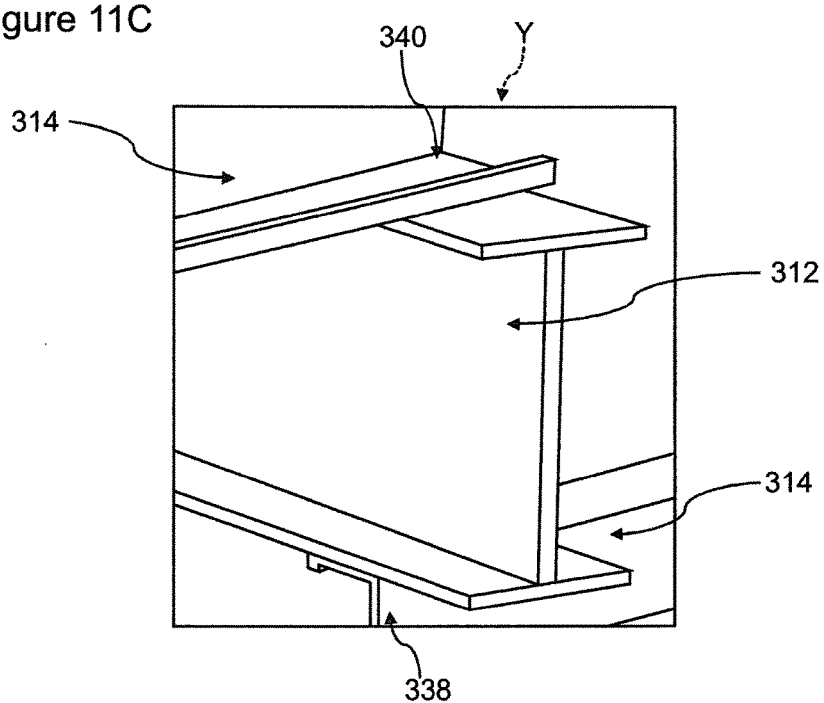

FIG. 11B diagrammatically shows the roofing assembly of FIG. 11A when viewed from direction A and simplified for clarity; and FIG. 11C is an enlarged view of part of the roofing assembly shown in FIG. 11A.

Referring firstly to FIGS. 1 to 6, there is shown one embodiment of a solar-collector roofing assembly, indicated globally at 10, suitable for an outdoor structure. The roofing assembly 10 comprises a plurality of elongate primary support members 12, a plurality of elongate secondary support members 14 and one or more solar-energy collector panels 16.

The primary support members 12 are preferably Universal Beams, also known as I-beams, having top and bottom flanges 18, 20 joined by a web 22. At a plurality of intervals along the length of the web 22 are connection points 24 to which the secondary support members 14 are connectable. Each connection point 24 comprises an upper and a lower portion 26, 28, each having one or more bolt-holes 30, which are slotted so as to allow for some tolerance when installing the secondary support members 14.

Figure 3:
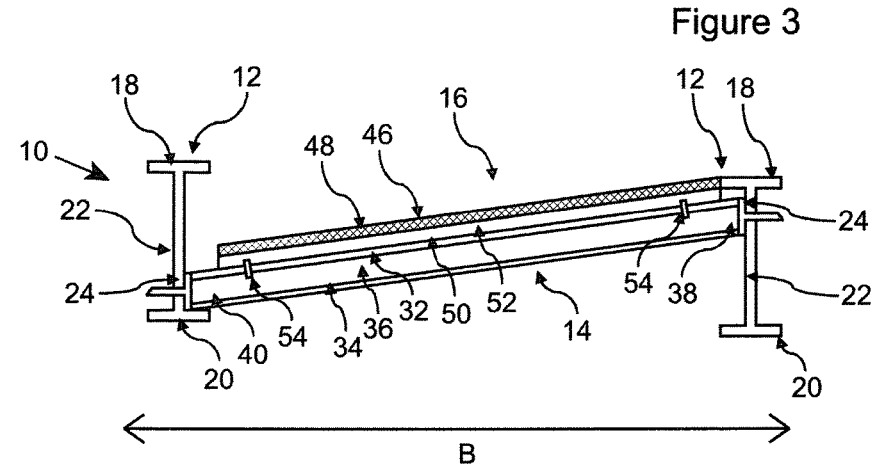
FIG. 3 shows the roofing assembly of FIG. 1 as viewed from direction A.

The secondary support members 14 are also Universal Beams, having top and bottom flanges 32, 34 joined by a web 36. However, unlike the primary support web 22, the secondary support web 36 preferably has a parallelogram rather than a rectangular profile, as best seen in FIG. 3. At each of the first and second end portions 38, 40 of the secondary support members 14 is a connection plate 42 which is capable of attaching to the connection points 24 of the primary support members 12, typically utilising bolts or rivets.

The top flange 32 of each secondary support member 14 includes a plurality of panel connecting elements, which are the means by which the or each solar-energy collector panel 16 is connected to the roofing assembly 10. To form the solar-collector roofing assembly 10, the primary support members 12 are arranged in a parallel spaced-apart configuration, and are interconnected by a plurality of secondary support members 14. Since each secondary support member 14 has a parallelogram-shaped web 36, the secondary support members 14 do not lie in a horizontal plane, but will have a predetermined fall from one primary support member 12 to the next.

Figure 4:
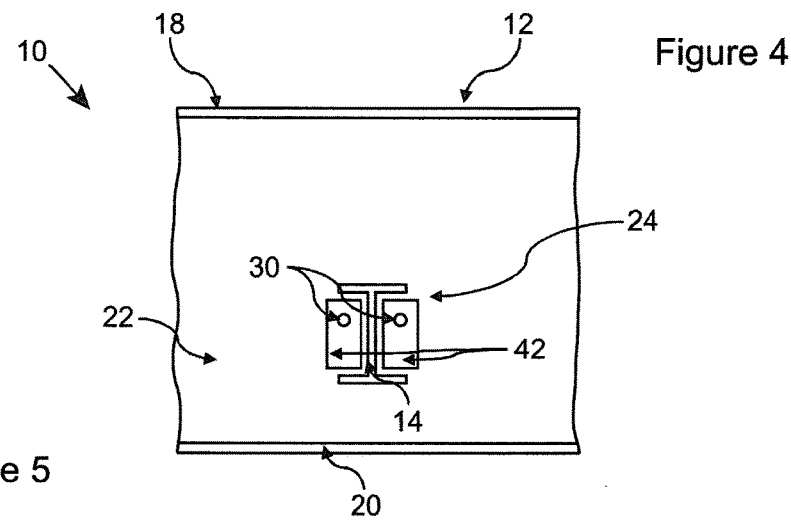
FIG. 4 shows the connection point between the first and second support members of the roofing assembly of FIG. 1.

As shown in FIG. 4, the first end portion 38 of a secondary support member 14 is connected to the upper portion 26 of a connection point 24 of a primary support member 12. As a result of the parallelogram-shape of the secondary support member 14, the web 36 slopes along a predetermined fall towards the second end portion 40. This fall is typically between 2 and 3 degrees.

Depending upon the length of the secondary support member 14, the second end portion 40 will have a lower vertical position relative to the first end portion 38, and can therefore be connected to the lower portion 28 of a connection point 24 on another primary support beam 12.

The fall over the secondary support member 14 is therefore sufficiently shallow to allow for the connection of a first and second end portion 38, 40 of two secondary support members 14 within the depth of a single primary support member 12, the two secondary support members 14 being connected on opposing faces of the web 22 of the primary support member 12.

A framework can therefore be constructed to a given size, comprising primary support members 12 arranged in a parallel spaced-apart manner along a first direction A which are interconnected by a plurality of secondary support members 14 ananged in a parallel spaced-apart manner substantially along a second direction B. The secondary support members 14 are oriented such that their falls are aligned in parallel.

Figure 1:
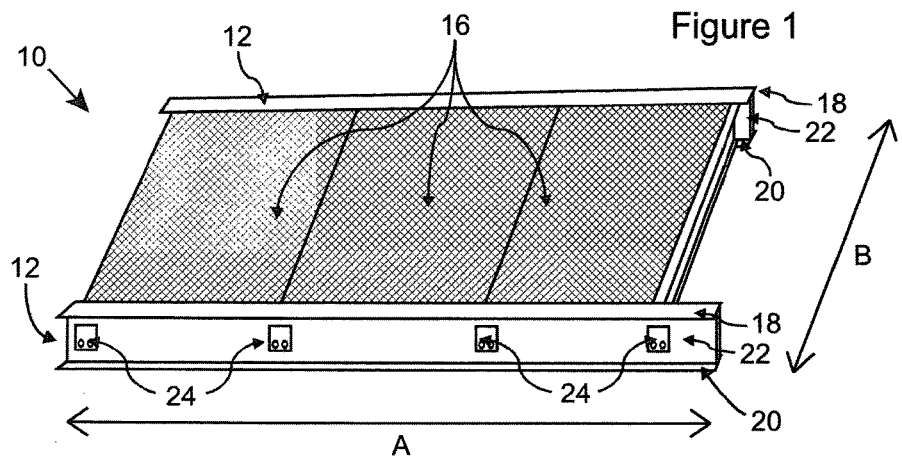
FIG. 1 shows a diagrammatic perspective representation of one embodiment of a solar collector roofing assembly in accordance with the second aspect of the invention.
Figure 2:
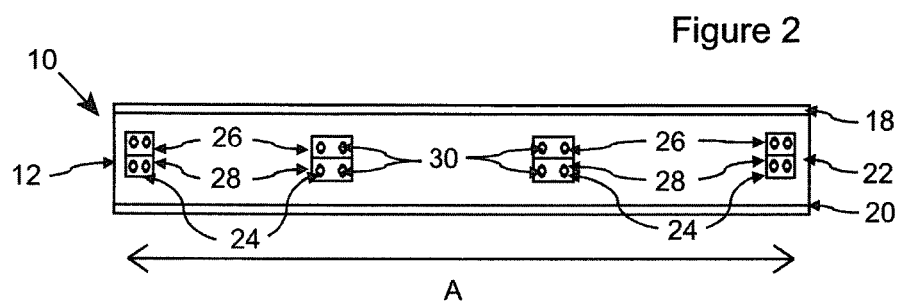
FIG. 2 shows the roofing assembly of FIG. 1 as viewed from direction B.

The resulting framework, when viewed from the first direction A, has a zig-zagged or serration-like profile, as shown in FIG. 3. However, since the fall of the secondary support members 14 is contained fully within the depth of the primary support members 12, the framework appears fully planar when viewed from the second direction B, as shown in FIG. 2.

Figure 8:
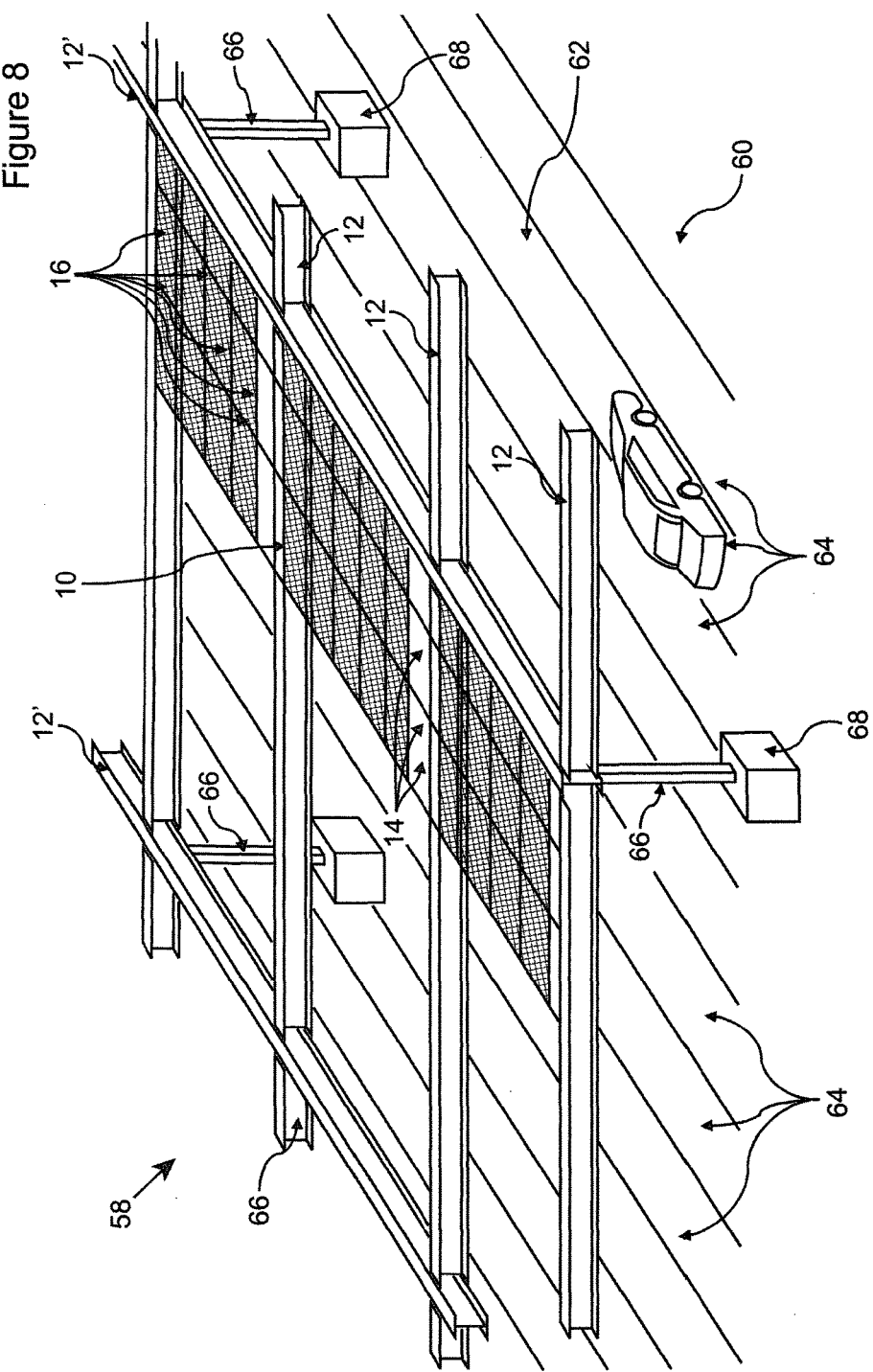
FIG. 8 shows a diagrammatic representation of a second embodiment of a vehicle parking system in accordance with the third aspect of the invention.

Whilst the framework can be utilised as assembled in the solar-collector roofing assembly 10, it may be desirable to provide a more rigid structure. This can be achieved by installing further elongate primary support members 12' in the horizontal plane as defined by the primary support members 12, but aligned in a parallel spaced-apart manner along the second direction B. A framework including such further primary support members 12' is shown in FIG. 8.

The installation of further primary support members 12' increases the strength and rigidity of the roofing assembly 10, but also the weight. Therefore, the decision to include further primary support members 12' will be determined by the relative importance of these factors to the structure for which the roofing assembly 10 is created.

To complete the roofing assembly 10, at least one solar-energy collector panel 16 is attached to the secondary support members 14. Solar-energy collector panels 16 will typically be photovoltaic panels, having an upper surface 46 with a plurality of solar cells 48 thereto affixed, and a lower surface 50 comprising a supporting substrate 52 for the solar cells 48.

Figure 5:
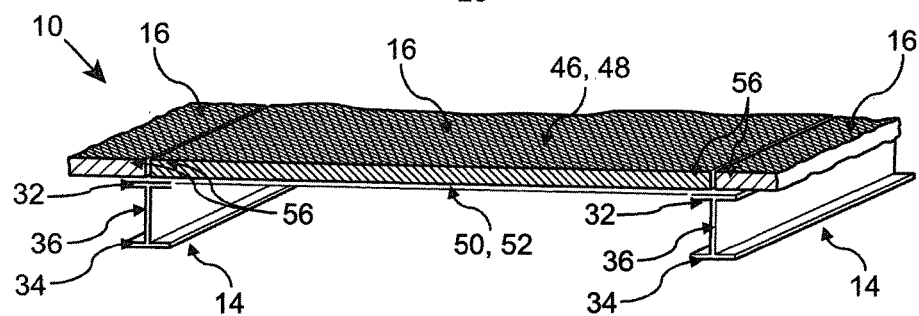
FIG. 5 shows a cross-sectional perspective view through centre of the roofing assembly of FIG. 1 along direction A.
Figure 6:
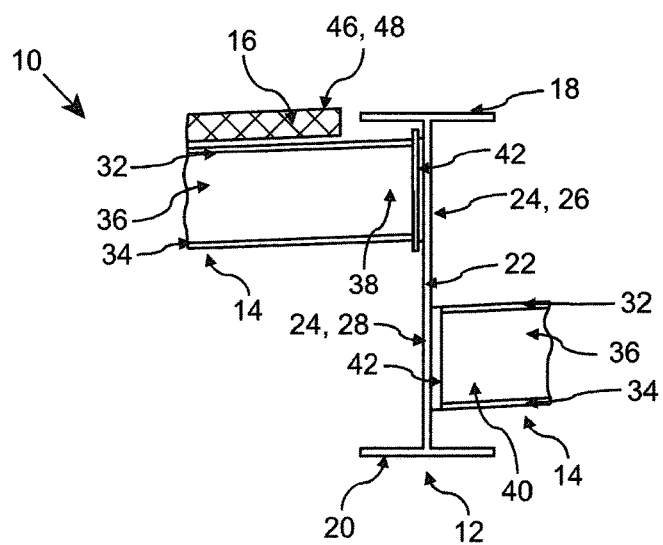
FIG. 6 shows a cross-sectional view through a connection point along direction B as shown in FIG. 4.

Each solar-energy collector panel 16 has a connecting means 54 affixed to the lateral extremities 56 of the supporting substrate 52, by which the panel 16 can be attached to the connecting elements 44 of the secondary support members 14. Each solar-energy collector panel 16 straddles two adjacent secondary support members 14, as seen in FIG. 5, and a plurality of solar-energy collector panels 16 are provided between each pair of secondary support members 14. Such modularisation allows for smaller solar-energy collector panels 16 to be utilised, reducing the effort required when replacing individual panels 16.

Once the solar-energy collector panels 16 have been installed, the solar-collector roofing assembly 10 is complete, and the assembly 10 can be installed as the roof of a structure. Typically, a roofing assembly 10 will be installed as part of an outdoor structure which may not necessarily have retaining walls.

In particular, the roofing assembly 10 of the present invention is designed for use with a vehicle parking system, such as a substantially open-air car park 58. See FIGS. 7 and 8. Such a car park 58 would be provided on a substantially level surface 60, upon with is demarcated at least one access road 62, from which laterally extend a plurality of marked parking bays 64. A solar-collector roofing assembly 10 can then be installed thereover. The roofing assembly 10 is supported by a plurality of vertical support members 66, providing sufficient clearance to permit passage of vehicles along the access road 62.

Said vertical support members 66 are again Universal Beams, connected to the primary support members 12 of the roofing assembly 10. The vertical support members 66 are positioned so as to project upwardly from the level surface 60, between parking bays 64, thereby maximising the parking area of the car park 58. To ensure the stability of the vertical support members 66, they will typically have solid concrete foundations 68, preferably positioned at or adjacent to distal corners of the parking bays 64 relative to the access road 62.

The vertical support members 66 may be clad at least at vehicle level in an impact resistant substance such as a foam-based padding. This will limit the damage to the structure should a vehicle impact or collide with any of the vertical support members 66 whilst navigating the car park 58.

Figure 7:
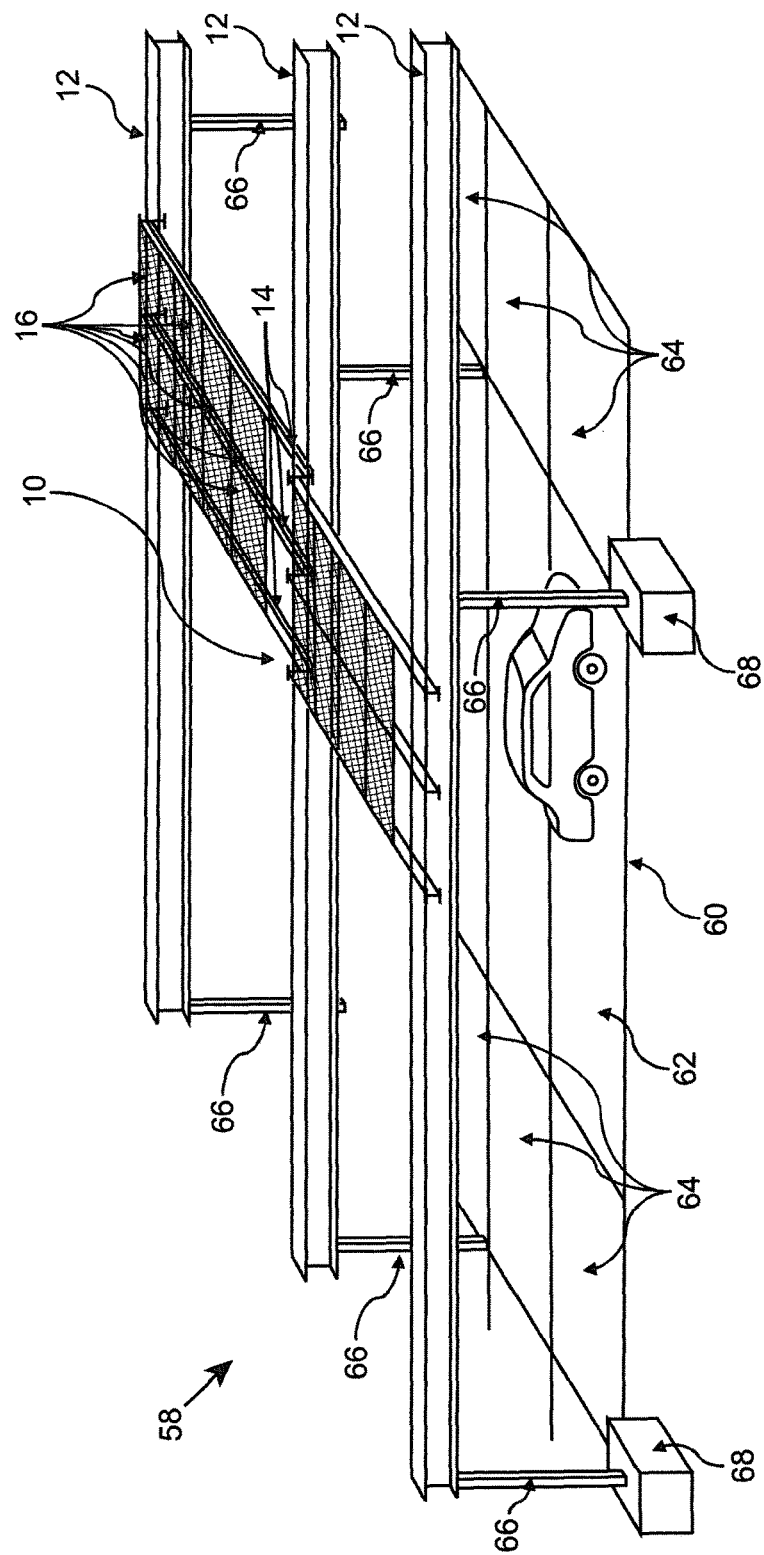
FIG. 7 shows a diagrammatic representation of a first embodiment of a vehicle parking system in accordance with the third aspect of the invention.

The design of the car park 58 will therefore determine the form of the roofing assembly 10. A preferred car park design 10 is to have equally spaced-apart primary support members 12, being aligned perpendicularly to the access road 62. Vertical support members 66 are arranged in convenient positions to maximise the parking area, typically at an intersection between four back-to-back parking bays 66. Such a vehicle parking system is shown in FIG. 7.

The roofing assembly 10 could alternatively be aligned in the opposite direction, with the primary support members 12 being in alignment with the access road 62. Typically, the access road 62 will be wider than the length of the parking bays 64, and in order to suitably accommodate the vertical support members 66, the separation between primary support members 12 may be unequal.

By way of example, there may be a primary support member 12 extending substantially along the extent of each side of the access road 62. This would require a separation between the primary support members 12 of approximately six meters, with accordingly sized secondary support members 14 therebetween. Such a car park is shown in FIG. 8, in this case including further or supplementary primary support members 12'. Either side of these primary support members 12, there will be another gap of approximately four meters, corresponding to the length of a parking bay 64, before the next primary support member 12. Again, there will be accordingly sized secondary support members 14 extending therebetween.

The approximately fourteen meter wide unit defined by the four primary support members 12 can be repeated at will, with parking bays 64 arranged back-to-back. It will be appreciated that this is merely the standard arrangement of a car park 58, and any arrangement could be considered. Furthermore, there will likely be interconnecting access roads between the main access roads 62 to permit navigation of the car park 58 by vehicles.

By combination of the repeating unit, a roofing assembly 10 can be created to cover any size of level surface 60 to create the car park 58. It is therefore possible to provide a roof for the car park 58 which is capable of harnessing solar energy. To utilise the energy, it is therefore necessary to provide the relevant infrastmcture to transmit or use the generated electricity. If the electricity is being sold to a national grid, this may be as simple as providing cables, but if the electricity is being used in situ, further infrastructure may be required, for instance, a substation.

To maximise the solar-energy collected by the solar-collector roofing assembly 10, it is optimal to align the primary support members 12 along a substantially east-to-west direction, with the fall of the secondary support members 14 being from north-to-south. By doing so, the solar-energy collector panels 16 will be oriented in a southward direction, which, in the northern hemisphere, will result in maximum incident solar radiation. Evidently, were the roofing assembly 10 to be provided in the southern hemisphere, the reverse would be applicable.

Since the car park 58 is likely to have at least partially open walls, there will be wind-loading on the roofing assembly 10. In existing solar collector roofing assemblies, a substantial portion of the roof as a whole is aligned along a predetermined fall. As such, the wind-load is relatively large, as the wind catches underneath the solar panels.

By providing the roofing assembly 10 of the present invention within a horizontal plane, to the depth of the primary support members 12, the lateral force experienced by the roofing assembly 10 in high winds is greatly reduced. As such, the roofing assembly 10 can be formed from considerably fewer supporting members than existing assemblies, since fewer reinforcing beams are needed.

In addition, the construction of the present roofing assembly 10 is considerably simpler than that of existing assemblies, since there is no requirement to apply a fall to the primary support members. This typically has to be achieved by installing struts to raise one end portion of a primary support member vertically.

This vertical raising of the primary support members also creates gaps in the roofing assembly, which either must be sealed, or the roofing assembly will allow ingress of rainwater or similar, which defeats the purpose of a car park to a large extent. Since the secondary support members 14 are wholly contained within the depth of the primary support members 12, the roofing assembly 10 is automatically sealed against the elements, following the installation of the solar-energy collector panels 16.

Given that the roofing assembly 10 is sealed, it may be preferable to install various extra components to accommodate inclement weather conditions. For instance, a drainage system for the removal of rainwater is a logical addition to the assembly, as might be a heating apparatus to melt any snow or ice which might form on top of the solar-energy collection panels 16. Any such heating apparatus could be powered by the electricity generated by the solar collector roofing assembly.

Figure 9:
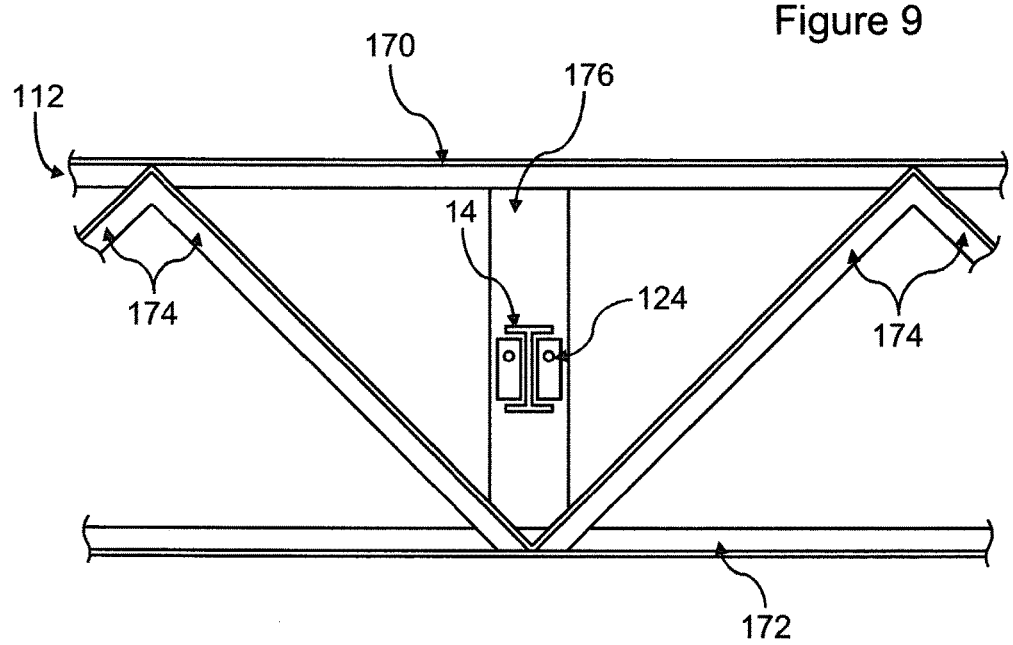
FIG. 9 shows an alternative embodiment of a primary support member for use with a roofing assembly in accordance with the second aspect of the invention.

It will be appreciated that whilst the primary support members are described above as being Universal Beams, there is no requirement for them to be so. One possible alternative embodiment of a primary support member 112 is shown in FIG. 9.

The primary support member 112 is a truss, comprising top and bottom flanges 170, 172, interconnected by a plurality of struts 174 arranged in a triangulated fashion along the length of the flanges 170, 172. At periodic intervals along the length of the primary support member 112, there will be upright buttresses 176, on which are located connection points 124 for interconnecting with secondary support members 14. This is merely one possible alternative embodiment of the primary support member, and several arrangements could be envisaged.

The main advantage of using trusses instead of Universal Beams is that less steel is used in its construction for the same length of support member. However, this benefit must be weighed against the increased cost of fabrication of a truss compared with a Universal Beam, and therefore the type of beam used will be dependent upon the cost trade-off between these competing factors.

Figure 10B:
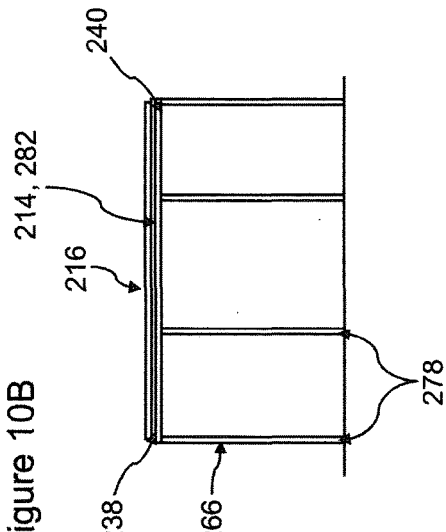
FIG. 10B shows a diagrammatic representation of the roofing assembly of FIG. 10A when viewed from direction A and simplified for clarity.
Figure 10A:
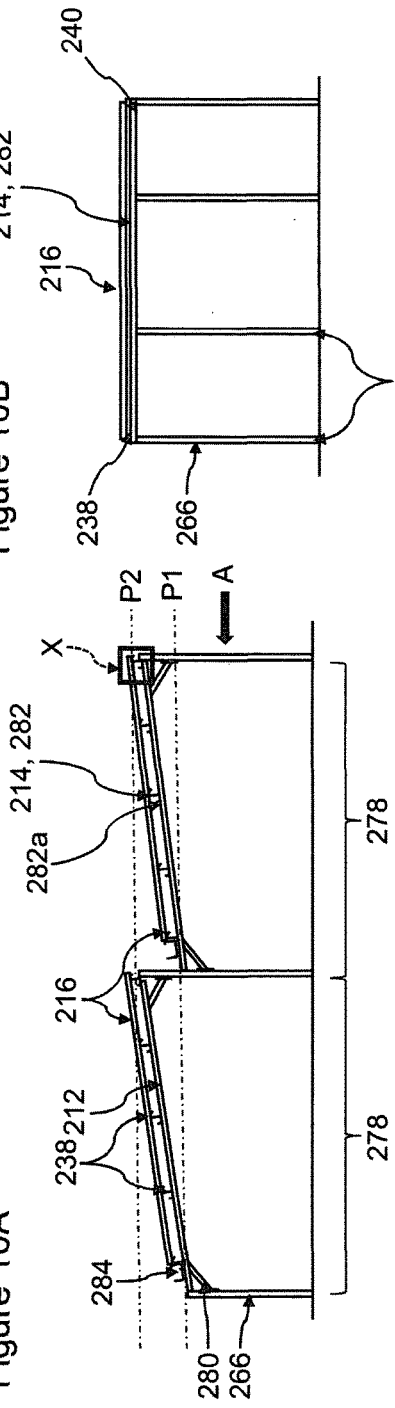
FIG. 10A shows a side-on view of a second embodiment of a solar collector roofing assembly in accordance with the first aspect of the invention.
Figure 10C:
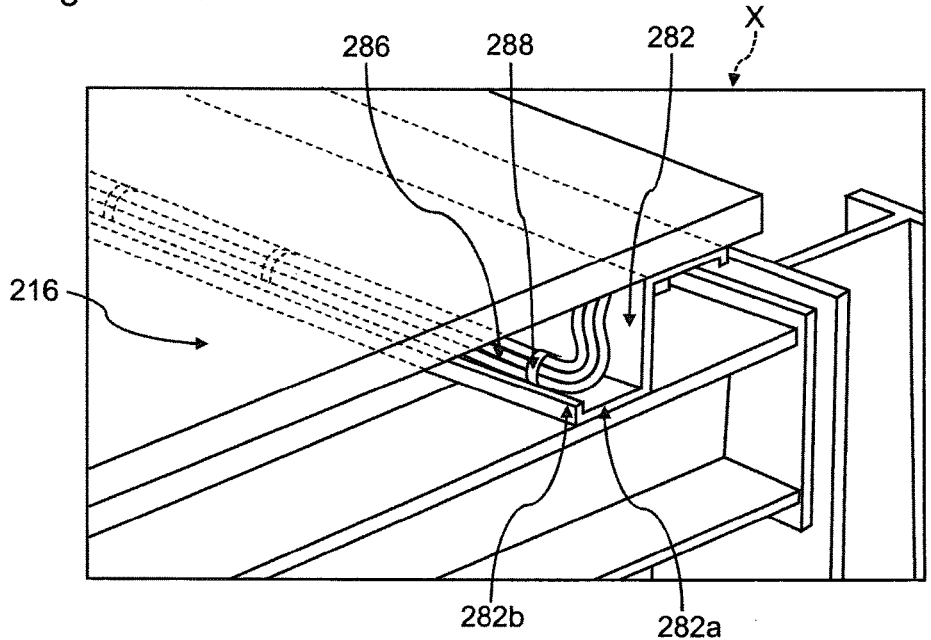
FIG. 10C is an enlarged view of part of the roofing assembly shown in FIG. 10A.

Referring now to FIGS. 10A to 10C, there is shown a second embodiment of a solar collector roofing system. Similar references refer to identical or similar parts, and further detailed description is omitted. This roofing system comprises primary support members 212, aligned in a plane, which form part of two portal frames 278. The portal frames 278 additionally comprise vertical support members 266 and also preferably corner struts 280 conjoining the primary support members 212 and vertical support members 266 of each portal frame 278. The arrangement of the portal frame 278 is advantageous as lateral loads, such as those caused by wind, are advantageously transferred by the corner struts 280 to the vertical support members 266, which transmit the then vertical loads to the foundations.

This transfer of the lateral loads is in addition to the transmission of vertical loads, such as structural weight, snow, wind uplift, and other forces, ensuring that the foundations supporting the portal frames 278 are not subjected to bending moments. This is a significant advantage over standard cantilevered solar collector roofing systems. Additionally, the portal frames 278 reduce the maximum bending stresses in the primary support members 212 by up to 75% compared to if they were simply supported.

Secondary support members 214 are then connected by at least their first and second end portions 238, 240 perpendicularly to respective primary support members 212. In this embodiment, the secondary support members 214 are preferably Z-purlins 282. These Z-purlins 282 support the solar-energy collector panels 216 and their bottom flanges 282a can act as cable trays for power cabling and the like.

The solar-energy collector panels 216 are sloped at approximately 2.5 degrees from horizontal in a north-to-south direction. This provides a higher intensity of light per unit area of the panel 216 due to the angle of the Sun in the sky. However, where two portal frames 278 meet, there may be shadowing. Therefore, the solar-energy collector panels 216 preferably do not extend the entire length of the primary support members 212. Advantageously, this allows drainage means or a drainage system, which in this embodiment is a gutter 284, to be situated at the lowermost end of each army of solar-energy collector panels 216, in order to capture any water run-off, which can then be channelled away and disposed of FIG. 10B shows how each portal frame 278 is interlinked by the secondary support members 214, with each portal frame 278 being parallel to one another. More or fewer portal frames 278 could be utilised in the same or similar arrangement, extending either in a parallel manner in one direction or in a series manner in the other direction as shown in FIG. 10A, creating a repeating sawtooth pattern. This allows the system to be readily and modularly expandable. As the secondary support members 214 span continuously over a number of primary support members 212, the maximum bending stresses in said secondary support members 214 are reduced by up to 75% compared to if they were simply supported. This ensures better structural integrity, and is advantageous over prior known solar collector roofing systems.

As can be seen in FIG. 10A, first ends of the primary support members 212 are aligned in a first horizontal plane P1, whilst second ends are aligned in a second horizontal plane P2. The end portions 238, 240 of the secondary support members 214 are vertically offset relative to one another on each respective primary support member 212.

The width of the portal frames 278 allows cars to drive through the centre of portal frames and park without having to include vertical support members 266 at the intersection between access roads and parking spaces, in a similar manner to the previously described embodiments. This is suitable for car parks with access roads in an east-to-west orientation. Therefore, in order to allow orientation of the system in a perpendicular direction, whilst maintaining the advantageous inclination of the solar-energy collector panels 216, a third embodiment is required, as shown in FIGS. 11A and 11B.

The third embodiment is similar to the second embodiment, but portal frames 378 themselves have horizontal primary support members 312. In order to incorporate the slope of the solar-energy collector panels 316, adjacent portal frames 378 are preferably different heights. This results in primary support members 312 which are aligned in an inclined plane.

Perpendicular to the primary support members 312 and inclined so as to have at least first and second end portions 338, 340 attached to respective primary support members 312 are the secondary support members 314, which again are preferably Z-purlins 382. At the lowermost end of the Z-purlins 382 may be located gutters 384, for channelling water run-off.

This third embodiment has all of the advantages of the second embodiment, but is more suited to providing a roofing system for parking in the perpendicular direction. This is due to the portal frames 378 of FIG. 11A being aligned at 90 degrees to those of FIG. 10A, allowing access roads and car parking spaces also to be aligned differently, without having to place vertical support members 362 in proximity to access roads, similarly to the above described embodiments. The embodiment of FIGS. 11A and 11B is therefore particularly suited to those car parks with access roads in a north-to-south configuration. It is also suitable for expansion of scale, in the same way as the second embodiment described with reference to FIGS. 10A and 10B.

FIG. 11A shows how the primary support members 312, which are present at the top of each of the portal frames 378 are aligned in horizontal planes with the longitudinal extent of each primary support member 312 extending in a direction into the page, as shown. In the particular embodiment shown, planes P3, P4, and P5 show the alignment in horizontal planes of every third portal flame 378. The end portal frames are horizontally-aligned with plane P3, whilst the two central portal frames of each group of three are horizontally-aligned with planes P4 and P5 respectively. Clearly, there may be a greater or lesser number of portal frames per group, and therefore there will be a greater or lesser number of horizontally-aligned planes. Equally, the ends of each primary support member 312 are aligned horizontally with each other, such as plane P6 as shown on FIG. 11B.

In the embodiments of FIGS. 10 and 11, the bottom flanges 282a, 382a of the Z-purlins 282 are utilised as cable trays or cable guides. This is shown in detail in FIG. 10C which is an enlarged perspective view of box X of FIG. 10A. The arrangement shown thus allows the cabling 286 and other items associated with the solar-energy collector panels 216, positioned on top of the Z-purlins 282, to be supported and channelled along the structure. The cabling 286 is additionally bundled together by ties 288, keeping the cabling 286 tidy and ordered. The bottom flange 282a additionally has an upward extending portion 282b which prevents or limits the cabling 286 becoming displaced from the bottom flange 282a. Other methods of bundling the cabling, including but not limited to tape or strapping, may be utilised in place of ties in order to bundle the cabling and/or ensure that the cabling is not displaced from the Z-purlins.

FIG. 11C, which is an enlarged perspective view of the contents of box Y of FIG. 11A, shows more particularly how the primary and secondary support members 312, 314 are positioned relative to one another. It is therefore clear that the first end portion 338 of one secondary support member 314 and the second end portion 340 of another secondary support member 314 are each connected to a primary support member 312. These connections are therefore vertically-offset. This primary support member 314 then forms a part of a portal frame, which is not shown.

Whilst the present embodiments have been described separately, it will be apparent to the skilled person that any feature described in one embodiment may be utilised in conjunction with another embodiment, or omitted, without departing from the scope of the present invention.

It will also be appreciated that the car park arrangements described above are merely examples of possible car park designs which could be covered by the present invention. It will also be apparent that the roofing assembly is not only applicable to the field of vehicle parking systems, but to any outdoor structure which may require a solar collector, where wind-load may be an issue. By way of example, a children's outdoor play area could be covered.

It is therefore possible to provide a solar-collector roofing assembly for an outdoor structure which experiences a reduced wind-load, by providing the primary support members of the assembly in a plane, preferably being a horizontal plane. The secondary support members which support the solar-energy collector panels are aligned in a different plane and are perpendicular to the primary support members. Preferably, the secondary support members are aligned out of the horizontal plane, but are vertically subsumed within the depth of the primary support member. Such assemblies may be formed in a sawtooth-profile arrangement. As such, the optimum alignment of solar-energy collector panels is achieved without increasing the lateral forces on the structure which result from an assembly having an overall predetermined fall.

Resultantly, the overall weight and amount of material required for construction of said roofing assembly can be greatly reduced. The primary use for the present invention is for large outdoor structures, in particular car parks, enabling a further revenue and/or energy generation means to an otherwise unutilised area having incident solar radiation.

The words 'comprises/comprising' and the words 'having/including' when used herein with reference to the present invention are used to specify the presence of stated features, integers, steps or components, but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of examples only, and various other modifications will be apparent to persons skilled in the field without departing from the scope of the invention as defined by the appended claims.

The invention claimed is:

1. A car-park solar-collector roofing assembly comprising:
   a plurality of elongate spaced-apart primary support members aligned in a plane and extending in a first direction, the plurality of primary support members with a plurality of vertical support members forming a plurality of portal frames;
   a plurality of elongate spaced-apart secondary support members, each secondary support member being supported by more than two portal frames and each portal frame supporting a plurality of secondary support members, the secondary support members being aligned in a plane extending in a second direction perpendicular to the first direction; and
   at least one solar-energy collector panel supported by the secondary support members, so as to have a predetermined fall; and
   the secondary support members including an integrally formed cable guide to hold one or more cables associated with the or each solar-energy collector panel;
   wherein the secondary support members comprise Z-purlins and a bottom flange of each Z-purlin acts as the integrally formed cable-guide, the bottom flange having an upward extending portion at an outside edge thereof so that a cable-receiving channel is defined between the upward extending portion and a web of each Z-purlin, the or each solar-collector panel supported directly on an upper flange of each Z-purlin.

2. The car-park solar-collector roofing assembly as claimed in claim 1, wherein the or each solar-energy collector panel is inclined at between 2 and 3 degrees.

3. The car-park solar-collector roofing assembly as claimed in claim 1, wherein the fall of the or each solar-energy collector panel is sloped from a north to south direction, such that the or each solar-energy collector panel faces in a southward direction, or is sloped from a south to north direction, such that the or each solar-energy collector panel faces in a northward direction.

4. The car-park solar-collector roofing assembly as claimed in claim 1, further comprising a drainage system which removes excess water collected on an upper surface of the roofing assembly.

5. The car-park solar-collector roofing assembly as claimed in claim 1, further comprising a heating apparatus which inhibits the formation of snow or ice on the or each solar-energy collector panel.

6. A vehicle parking system comprising:
   a surface for defining an access road in a first direction and a plurality of parking bays extending from the access road in a second direction transversely to the first direction;
   a solar-collector roofing assembly as claimed in claim 1; and
   a plurality of vertical support members to support the solar-collector roofing assembly above said surface.

7. The vehicle parking system as claimed in claim 6, wherein the primary support members are equally spaced-apart, and aligned perpendicularly to the access road.

8. The vehicle parking system as claimed in claim 6, wherein the separation between the primary support members above the access road is greater than the separation between the primary support members above the parking bays.

9. The car-park solar-collector roofing assembly as claimed in claim 1, wherein each portal frame further comprises corner struts conjoining the primary support members and vertical support members.

10. The car-park solar-collector roofing assembly as claimed in claim 1, wherein each primary support member comprises a beam or a truss.

11. The car-park solar-collector roofing assembly as claimed in claim 10, wherein each primary support member comprises an I-beam.

12. The car-park solar-collector roofing assembly as claimed in claim 1, wherein each portal frame supports more than two secondary support members.

* * * * *